United States Patent [19]
Ross et al.

[11] Patent Number: 5,845,598
[45] Date of Patent: Dec. 8, 1998

[54] INTEGRATED GAUGE MECHANISM AND LIGHT PIPE

[75] Inventors: David Alan Ross, Columbiaville; Ronald Kenneth Selby, Burton; Randall Jay Heidtman, Davison; Gail Monica Sylvester, Frankenmuth, all of Mich.

[73] Assignee: Delco Electronics Corporation, Kokomo, Ind.

[21] Appl. No.: 767,013

[22] Filed: Dec. 16, 1996

[51] Int. Cl.⁶ .................................................. G01D 13/22
[52] U.S. Cl. ............................................ 116/288; 116/286
[58] Field of Search .................................. 116/288, 287, 116/286; 362/26, 23

[56] References Cited

U.S. PATENT DOCUMENTS

| | | | |
|---|---|---|---|
| 2,837,053 | 6/1958 | Viret | 116/287 |
| 4,233,927 | 11/1980 | Oikawa et al. | 116/287 |
| 4,380,043 | 4/1983 | Takamatsu et al. | 362/26 |
| 5,531,181 | 7/1996 | Cookingham | 116/288 |
| 5,546,888 | 8/1996 | Skiver et al. | 116/286 |
| 5,678,912 | 10/1997 | Ayres et al. | 362/23 |
| 5,703,612 | 12/1997 | Salmon et al. | 345/75 |
| 5,706,757 | 1/1998 | Hashimoto et al. | 116/288 |

*Primary Examiner*—Diego F.F. Gutierrez
*Assistant Examiner*—Willie Morris Worth
*Attorney, Agent, or Firm*—Jimmy L. Funke

[57] ABSTRACT

An automotive gauge has a two part housing containing a stepper motor arrangement or other gauge movement which drives a pointer shaft. The front housing part consists of a transparent material for conducting light from a lamp to a facet which reflects light to a pointer for pointer illumination. The lamp is mounted inside or outside the housing. The front housing part includes an aperture for accommodating the pointer shaft and also has integral pins which serve as supports for rotary parts of the mechanism. The housing is mounted on a circuit board or a circuit board may comprise the rear housing part. Another embodiment uses a common light pipe member for the front housing of several gauges.

13 Claims, 2 Drawing Sheets

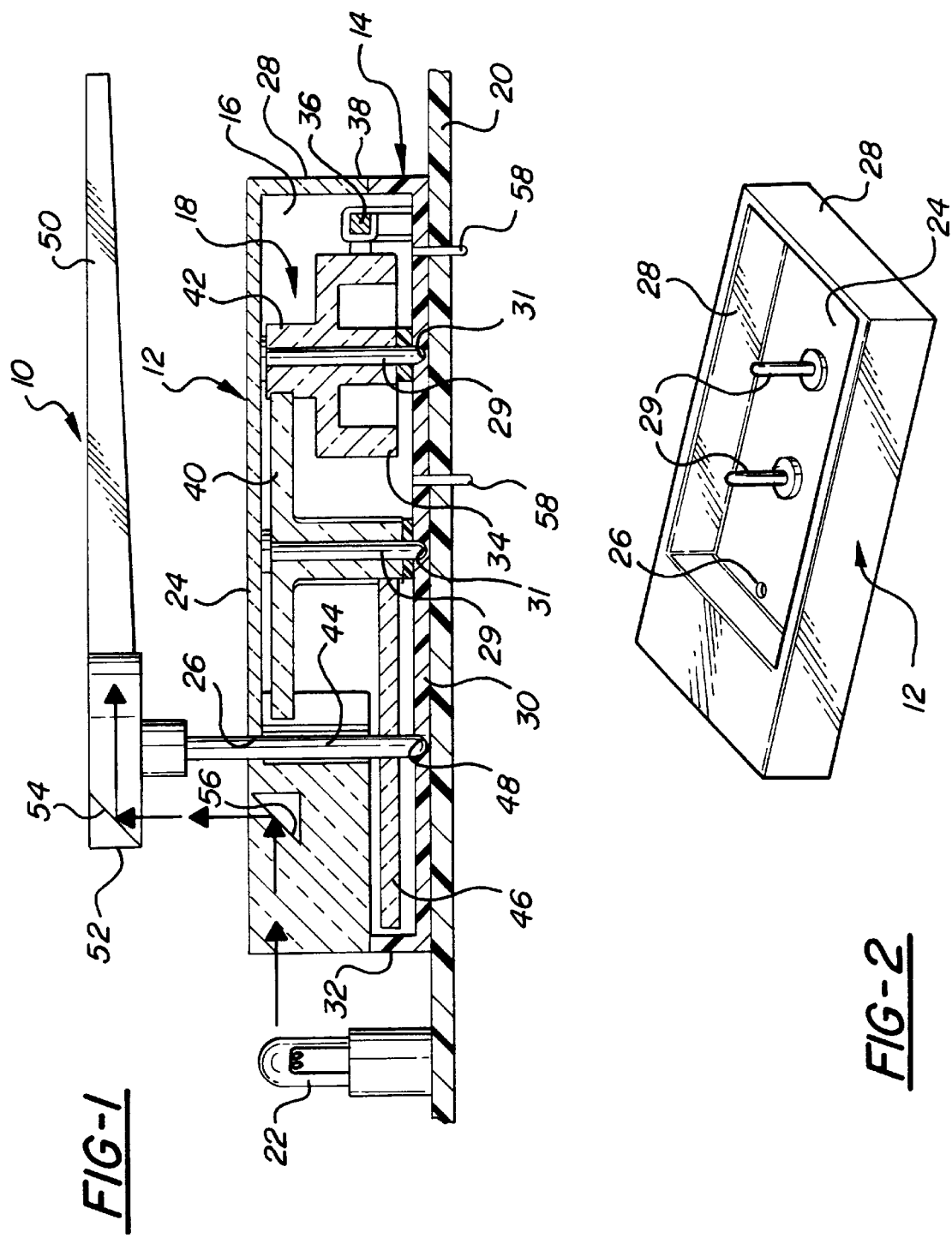

INTEGRATED GAUGE MECHANISM AND LIGHT PIPE

FIELD OF THE INVENTION

This invention relates to illuminated gauges and particularly to the incorporation of a light pipe into a gauge.

BACKGROUND OF THE INVENTION

In automotive instrument clusters it is common to use a transparent sheet as a light pipe and an applique or graphics defining gauge indicia on the front of the light pipe. Gauges are mounted on a circuit board in individual cases behind the light pipe, each having a pointer shaft extending through an aperture in the light pipe to carry a pointer in front of the light pipe to register with appropriate indicia on the applique. Light from sources at the edge of the light pipe is conducted to each gauge to illuminate the indicia and the pointers.

Here it is proposed to reduce the cost of a cluster assembly by eliminating parts while retaining the function of those parts. Especially, by eliminating a light pipe which spans the entire instrument cluster a major part is omitted and at the same time the thickness of the cluster can be reduced.

SUMMARY OF THE INVENTION

It is therefore an object of the invention to simplify instrument clusters by combining the functions of different parts to eliminate some of the parts. A further object is to integrate the pointer illumination function in a gauge. Another object is to combine gauges with a cluster light pipe.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a cross section of an automotive gauge according to the invention;

FIG. 2 is an isometric view of a housing part of the gauge of FIG. 1;

DESCRIPTION OF THE INVENTION

Figure 3:
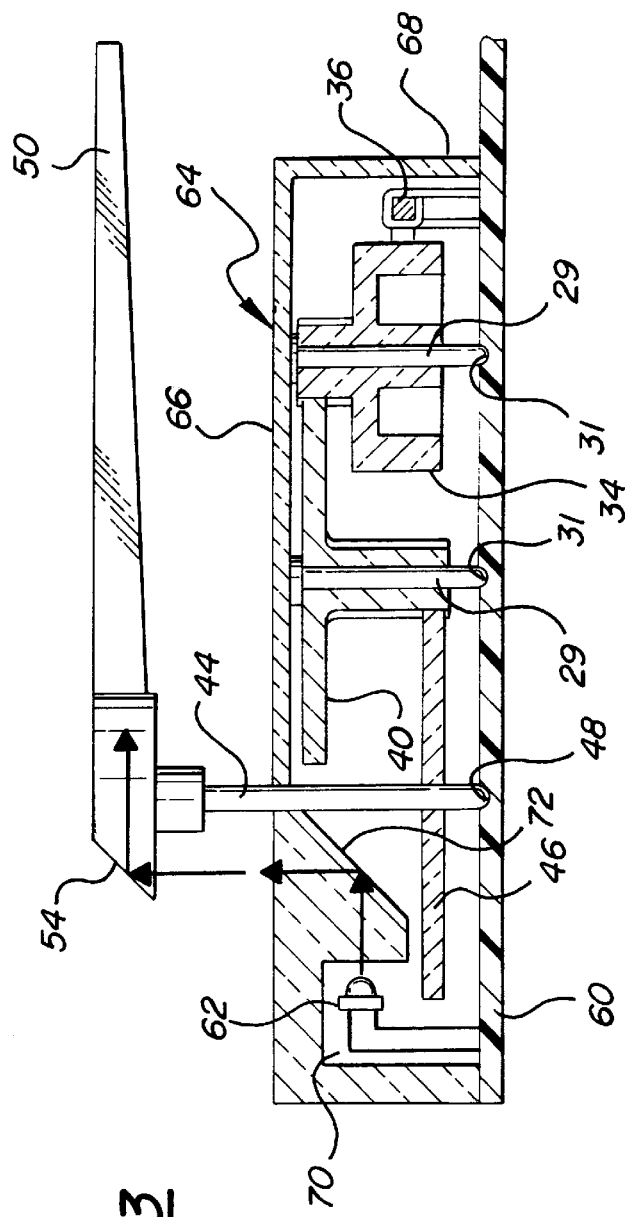
FIG. 3 is a cross section of an automotive gauge according to another embodiment of the invention.

Referring to FIG. 1, a gauge 10 for an automotive instrument cluster includes a front housing part 12 and a rear housing part 14 which join to form an enclosure 16 containing a gauge mechanism 18. The gauges is mounted on a circuit board 20 which carries a lamp 22 adjacent an edge of the front housing part 12.

The front housing part 12, also shown in FIG. 2, is made of a transparent material suitable for use as a light conductor and includes a front wall 24 having an aperture 26, side walls 28 and two shafts or pins 29 parallel to the side walls. The rear housing part 14 has a rear wall 30, and side walls 32 which mate with the walls 28 of the front housing part. The rear wall 30 has recesses 31 which snugly receive the ends of the pins 29 to afford lateral support. The mechanism 18 is exemplified as a stepper motor drive but other gauge movements could be used as well. It includes an armature 34 driven by a coil 36 on a stator 38, an idler gear 40 meshing with a pinion 42 on the armature, and a pointer shaft 44 having a gear 46 meshing with the idler gear 40. The armature 34 and the idler gear 40 each have a central bore which fits over a shaft or pin 29 for rotation. The pointer shaft 44 has one end which fits in a recess 48 in the rear housing part and a second end which extends through the aperture 26 in the front part and carries a pointer 50.

The pointer 50 has a light collecting end 52 near the pointer shaft including an angled reflecting surface 54 which directs light internally down the pointer, as is common practice. A facet 56 is molded into the front housing part in line with the pointer collecting end 52. The facet 56 reflects light from the lamp 22 to the reflecting surface 54 to thereby illuminate the pointer.

The rear housing part 14 has terminal pins 58 which mate with the circuit board 20. Conductors, not shown, connect the pins 58 to the leads of the coil 36. Thus the circuit board powers the gauge motor as well as supplying the lamp 22.

It will be appreciated that by consolidating the light pipe function in the housing structure, the assembly is reduced in size and number of parts. Such simplification is expected to lead to cost savings.

Another gauge embodiment shown in FIG. 3 uses a circuit board 60 in place of the rear housing part, thereby eliminating still another part and further reducing the gauge thickness as well. The lamp is an LED 62 mounted within the housing enclosure and connected to the circuit board. The front housing part 64 has a front wall 66 and side walls 68 which meet the circuit board. Internally the front housing part 64 is formed to afford space 70 for the LED and has a sloped wall 72 for reflecting light to the pointer 50. The gauge mechanism is the same as that of FIG. 1. In this case the coil 36 leads are directly connected to the circuit board. Appropriate recesses 31 and 48 in the circuit board accept the ends of pins 29 and pointer shaft 44. If desired a bearing insert could be used for rotational support of the pointer shaft.

Figure 4:
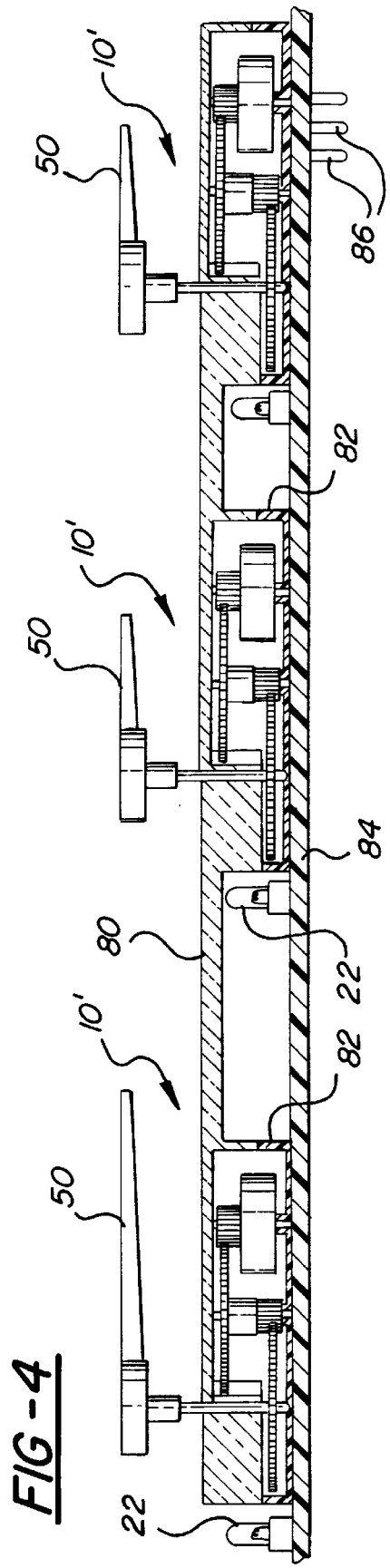
FIG. 4 is a cross section of an automotive gauge according to a third embodiment of the invention.

A third embodiment, shown in FIG. 4 (with details omitted), is a gauge cluster containing a plurality of gauges 10' which are essentially the same as the gauges 10 of FIG. 1, except that they all have a common light pipe 80 serving as the front housing parts of all the gauges. Each gauge, however has a separate rear housing part 82. A single circuit board 84 spans the cluster and is connected to each gauge 10' and to a lamp 22 for each gauge. In this case the light pipe can support the gauge graphics and the lamps 22 could be used to illuminated the dials as well as the pointers. Terminals 86 on the circuit board afford an external connection.

The embodiments of the invention in which an exclusive property or privilege is claimed are defined as follows:

1. A gauge for an instrument cluster comprising:

a housing having first and second parts defining an enclosure;

a gauge mechanism within the enclosure including a pointer shaft extending through an aperture in the first part;

a pointer carried by the pointer shaft outside the enclosure;

the first part of the housing comprising a light pipe for illuminating the pointer;

the mechanism includes a motor having an armature drivingly coupled to the pointer shaft and mounted for rotation on the first part of the housing;

the first part has mounting means for receiving the armature; and the second part of the housing including electrical means for actuating the mechanism.

2. The invention as defined in claim 1 including a light source for illuminating the light pipe.

3. The invention as defined in claim 1 wherein:

the second part of the housing comprises a circuit board; and a light source is mounted on the circuit board within the enclosure for illuminating the light pipe.

4. The invention as defined in claim 1 wherein:

the electrical means comprises a circuit board which extends beyond the first part of the housing; and a light source is mounted on the circuit board outside the enclosure for illuminating the light pipe.

5. The invention as defined in claim 1 wherein:

the mounting means comprises a shaft for the armature integral with the first housing part.

6. The invention as defined in claim 1 wherein:

a pair of shafts parallel to the pointer shaft are integral with the first housing part;

the mechanism includes a motor armature drivingly coupled to the pointer by an idler gear, the armature and the gear being mounted on the pair of shafts.

7. The invention as defined in claim 1 wherein:

the first housing part having at least one fixed integral shaft parallel to the pointer shaft and with an end extending toward the second housing part for rotatably supporting an element of the mechanism; and the second housing part having at least one recess for receiving an end of the at least one fixed shaft to thereby stabilize the fixed shaft.

8. The invention as defined in claim 1 wherein the first part of the housing includes:

a front wall and side walls of the housing; and an optical feature for directing light from the source to the pointer.

9. An instrument cluster having a plurality of gauges comprising:

a common light pipe containing a first housing part for each of the gauges;

a second housing part for each gauge attached to a respective first housing part on the light pipe, the light pipe and the respective second housing parts defining enclosures for respective gauges;

for each gauge a fixed shaft extends from the front housing part;

a gauge mechanism within each enclosure including a pointer shaft extending through an aperture in the first housing part, each mechanism including a motor having an armature drivingly coupled to the pointer and mounted for rotation on the fixed shaft;

pointers carried by the pointer shafts outside the enclosure; and the second part of each housing including electrical means for actuating the respective mechanism.

10. The invention as defined in claim 9 wherein the light pipe includes:

a flat front face comprising a front wall for each housing; and rearwardly extending side walls for each housing.

11. The invention as defined in claim 9 including a light source at each gauge for illuminating the light pipe.

12. The invention as defined in claim 9 wherein:

the electrical means comprises a circuit board which extends beyond the first part of each housing; and a light source is mounted on the circuit board outside each enclosure for illuminating the light pipe.

13. The invention as defined in claim 9 wherein:

the second housing part of each gauge has connector terminals; and a common circuit board is connected to the terminals of each gauge.

* * * * *